United States Patent Office 3,505,398
Patented Apr. 7, 1970

3,505,398
TEREPHTHALIC ACID CRYSTALLIZATION
Richard H. Baldwin, Oak Lawn, Ill., assignor to Standard Oil Company, Chicago, Ill., a corporation of Indiana
No Drawing. Filed Sept. 22, 1966, Ser. No. 581,164
Int. Cl. C07c 51/42
U.S. Cl. 260—525                                   6 Claims

ABSTRACT OF THE DISCLOSURE

This invention relates to a method of separating terephthalic acid and p-toluic acid mixtures which contain downward from 7 weight percent p-toluic acid. An aqueous solution of the above mixture, substantially saturated saturated with respect to terephthalic acid, is formed under liquid phase conditions at a temperature above 150° F. in the presence of 1 to 20 moles of alkali metal hydroxide per mole of p-toluic acid. This solution is then cooled to crystallize and recover terephthalic acid.

---

This invention pertains to the crystallization of terephthalic acid from aqueous solutions. More specifically this invention pertains to the recovery of terephthalic acid from aqueous solutions also containing p-toluic acid as solute.

Mixtures of terephthalic acid and p-toluic acid occur in the product obtained from the oxidation of p-xylene and from reductive purification steps in methods of purifying crude terephthalic acid having 4-formylbenzoic acid as the major impurity. Although p-toluic acid is substantially more soluble in water than is terephthalic acid as Table I indicates, it is exceedingly difficult to crystallize terephthalic acid free from contamination with p-toluic acid.

TABLE I
[Temperature, solubility characteristics, grams/100 grams of water]

| Temperature, ° F. | Terephthalic acid | p-Toluic acid |
|---|---|---|
| 160 | 0.011 | 0.355 |
| 200 | 0.023 | 1.80 |
| 250 | 0.068 | 8.0 |
| 300 | 0.21 | |
| 350 | 0.62 | |
| 365 | 1.0 | |
| 401 | 5.0 | |
| 468 | 10.0 | |
| 498 | 20.0 | |
| 522 | 30.0 | |

It has been conjectured that said difficulty arises because the molecule of p-toluic acid is so similar in structure to the structure of the terephthalic acid molecule that the attraction between the acid groups may occur. Thus a molecule of p-toluic acid could be drawn into or onto a crystal of terephthalic acid as though p-toluic acid were another molecule of terephthalic acid. It has also been conjectured that said difficulty arises because the chemical properties of p-toluic acid are so similar to the chemical properties of terephthalic acid from p-toluic acid as co-solutes in water by crystallization arises from similiarities in physical, structural or chemical properties, there is still the continuing commercial problem of how to efficiently effect the separation by crystallization techniques.

U.S. Patent No. 2,572,575 teaches treating terephthalic acid having p-toluic acid as impurity with water at 100 to 200° C. under pressure to maintain water in the liquid phase in an extraction step from which partially purified solid terephthalic acid is recovered by filtration at 100 to 200° C. The partially purified terephthalic acid is dissolved in aqueous caustic. This salt solution is acidified to precipitate free terephthalic acid crystals that are recovered by filtration, washed several times with water and dried. The ratio of terephthalic acid to water used in the exemplified water extraction step amounted to 4.4 to 4.8 grams/100 grams of water. The 175° C. (329° F.) extraction temperature or even the maximum 200° C. (392° F.) would not be high enough for 100 grams water to dissolve quite all the 4.4 to 4.8 grams terephthalic acid. At 392° F. 100 grams water dissolves about 1.7 grams terephthalic acid. Thus the teachings in this patent are of little help in devising a method of recovery of pure terephthalic acid from aqueous solutions also containing p-toluic acid solute.

U.S. Patent 2,838,565 teaches heating a mixture of terephthalic acid and p-toluic acid with water to a temperature in the range of 446 to 536° F. and a pressure to maintain water in the liquid phase to form a solution. The solution must not be cooled to a temperature below 329° F. to crystallize terephthalic acid from the solution. Exemplification of this process with solution formation at 500° F. and 725 p.s.i.g. followed by crystallization at 356° F. and 150 p.s.i.g. is said to give terephthalic acid of a purity of 99–100%.

A crystallization conducted by slowly cooling the 500° F. and 75 p.s.i.g. solution down to 356° F. and 150 p.s.i.g. as taught in U.S. Patent 2,838,565, accomplished for example by removing heat from the solution but not removing any of the solvent water, might well provide crystallized terephthalic acid of 99–100% purity. However, it has been observed that rapidly cooling an aqueous solution of terephthalic acid and p-toluic acid from down to 360° to 330° F. by evaporative cooling with or without removal of water vapor where there is present even small amounts of p-toluic acid in the range of 6000 to 500 parts per million (p.p.m.), and then holding the resulting mixture at 360 to 330° F. for one or more hours followed by filtration at those temperatures provides a separation factor in the range of 2 to 5. By separation factor is meant the weight ratio of p-toluic acid in crude terephthalic acid to p-toluic acid in recrystallized washed and dried terephthalic acid. Thus rapid cooling such as evaporative cooling, added to the purification process of U.S. Patent No. 2,838,565 as a means for cooling not below 329° F. does not provide a purified terephthalic acid having 200 to 100 or less p.p.m. p-toluic acid.

Terephthalic acid is rapidly becoming the commercial starting material of choice for the manufacture of high molecular weight polyethylene terephthalate polyesters. To be so used for direct esterification with ethylene glycol and the resulting polycondensation of bis (2-hydroxyethyl) terephthalate, the terephthalic acid should have a p-toluic acid content below 200 p.p.m., desirably 100 p.p.m. and below and preferably as low as in the 40 to 70 p.p.m. range. Ethylene glycol can also react with p-toluic acid to form 2-hydroxyethyl p-toluate, a monofunctional compound, that can operate as a polycondensation chain stopper to produce low molecular weight polyesters decreasing the strength and melting point of the total polyester product.

I have discovered a simple and useful technique for the method of recovery of terephthalic acid by crystallization from aqueous solution also containing a p-toluic acid as solute so that the recovered terephthalic acid has substantially less p-toluic acid. This simple and useful technique is to add from 1 to 10, desirably 2 to 10 and preferably 4 to 8 moles alkali metal hydroxide, preferably sodium or potassium hydroxide, per mole of p-toluic acid solute to the aqueous solution containing p-toluic acid and terephthalic acid. This technique is suitable for use with crude terephthalic acids containing as much as 5 to 7 percent by weight p-toluic acid. Desirably the technique is used with terephthalic acid containing no more than 1.0 percent by weight p-toluic acid. Preferably the technique is used with terephthalic acid having 6000 to 500 p.p.m. p-toluic acid. These choices take into consideration the economics of quantities of alkali metal hydroxide, the problems of storage and materials of construction for apparatus handling large amounts of alkali metal hydroxide. But more important, those choices take into consideration the fact that crude terephthalic acid having large amounts of p-toluic acid can be readily partially purified to a lower p-toluic acid content by one recrystallization from water, e.g. from 5 to 7% at start to 0.5 to 1.0% in recrystallized product.

Since the capacity of water to dissolve terephthalic acid is rather low at temperatures below about 400° F., it is desirable from the standpoint of handling volumes of solution to practice this invention with solutions at a temperature in the range of 400° to 700° F. These temperatures are well above the normal (atmospheric pressure) boiling point temperature of water. Thus, the process of this invention is carried out using a liquid phase of water to take full advantage of its solvent properties at 400° to 700° F. and so superatmospheric pressure of at least equal to the vapor pressure of water at those temperatures are used. It is desirable when operating at 400 to 700° F. to have the solution substantially saturated with respect to terephthalic acid solute. By "substantially saturated" is meant the solution is about 10° F. above the temperature where first crystals of terephthalic acid form. However, the process of this invention can be used with substantially saturated aqueous solutions of terephthalic acid at temperatures of from 150° F. if volume of liquids handled is of no consideration.

The following examples illustrate the process of this invention. In these examples and the comparative tests (no alkali metal hydroxide used) an aqueous solution having 20 pounds terephthalic acid per 100 pounds water and also 1500 p.p.m. p-toluic acid solute (Example 4 had 3000 p.p.m. p-toluic acid solute) based on terephthalic acid is prepared at 520° F. and 880 p.s.i.g. In the two comparative tests crystallization is accomplished by evaporative cooling at 4° F. per hour to 300° F. and then evaporative cooling by flashing to 212° F. and 0 p.s.i.g. (Comparative Test A) and by evaporative cooling at 4° F. per hour to 212° F. and 0 p.s.i.g. (Comparative Test B). In illustrative Examples 1, 2, 3 and 4 evaporative cooling at 4° F. per hour to 212° F. and 0 p.s.i.g. is used. The crystallized terephthalic acid products are recovered by filtration, washed with water and dried. For Comparative Tests A and B and for illustrative Examples 1, 2 and 3 the water wash was with water at 210° F. But for illustrative Example 4 the water wash was at 275° F. and was conducted under pressure. The results of these tests and examples are given in Table II. Sodium hydroxide is added to the water used to form the solutions for Examples 1, 2, 3 and 4 and is used in the mole ratio indicated.

TABLE II

[Effect of NaOH addition to solution containing 20 pounds terephthalic acid per 100 parts water]

| Test or example | P-toluic acid on terephthalic acid feed (p.p.m.) | Moles NaOH per mole P-toluic acid | P-toluic acid on dried product | Separation factor |
|---|---|---|---|---|
| Comparative Test A | 1,500 | 0 | 170 | 8.8 |
| Comparative Test B | 1,500 | 0 | 70 | 21 |
| Example 1 | 1,500 | 2 | 58 | 26 |
| Example 2 | 1,500 | 4 | 45 | 33 |
| Example 3 | 1,500 | 8 | 42 | 36 |
| Example 4 | 3,000 | 8 | 47 | 64 |

The use of potassium hydroxide in place of sodium hydroxide in the method Examples 1 through 4 give substantially the same results. The process of this invention is as effective in obtaining low p-toluic acid content recrystallized, washed and dried terephthalic acid. As above indicated, when higher concentrations of p-toluic acid to terephthalic acid, e.g. up to 5 to 7%, are present.

It is advantageous as above indicated to wash the recovered crystallized terephthalic acid with water at a temperature in the range of 225 to 290° F. Recovery of crystallized terephthalic acid can be by any means for solid-liquid separation such as filtration, centrifugation settling and the like.

What is claimed is:

1. A method of separating terephthalic acid and p-toluic acid mixtures which contain downward from 7 weight percent p-toluic acid which comprises forming an aqueous solution of said mixture under liquid phase conditions at a temperature above 150° F. substantially saturated with respect to terephthalic acid in the presence of 1 to 20 moles alkali metal hydroxide per mole p-toluic acid, cooling the resulting solution to crystallize terephthalic acid and recovering the crystallized terephthalic acid.

2. The method of claim 1 wherein the weight ratio of p-toluic acid to terephthalic acid in the mixture to be separated is not above 1% by weight and the mole ratio of alkali metal hydroxide to p-toluic acid is in the range of 1:1 to 10:1 and the solution temperature is in the range of 400° to 700° F. and the cooling for crystallization is to a temperature down to 210° F.

3. The method of claim 1 wherein the mixture to be separated has 500 to 6000 p.p.m. p-toluic acid based on terephthalic acid, the solution temperature is 400 to 700° F. and 2 to 8 moles alkali metal hydroxide per mole of toluic acid is used.

4. The method of claim 3 wherein the alkali metal hydroxide is sodium hydroxide.

5. The method of claim 3 wherein the alkali metal hydroxide is potassium hydroxide.

6. The method of claim 3 wherein the recovered crystallize terephthalic acid is washed with water at a temperature in the range of 225 to 290° F.

References Cited

UNITED STATES PATENTS 2,572,575   9/1951   Shafer et al. _____ 260—525
3,205,260   9/1965   Costabello et al. _____ 260—525

LORRAINE A. WEINBERGER, Primary Examiner

R. S. WEISSBERG, Assistant Examiner